July 29, 1952 — H. S. HOWE — 2,605,201
WIRE TIRE FABRIC AND CABLE
Filed Feb. 7, 1951
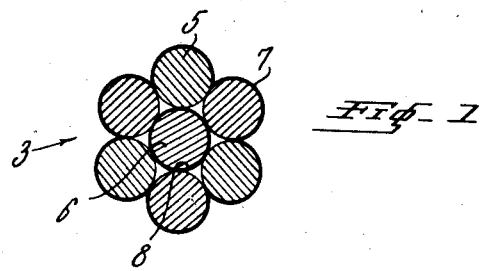
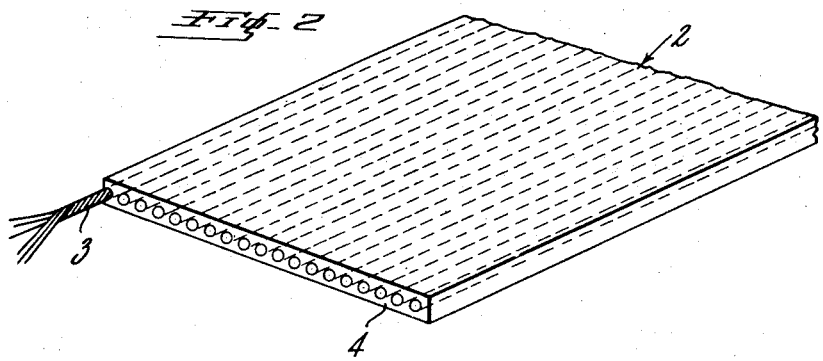
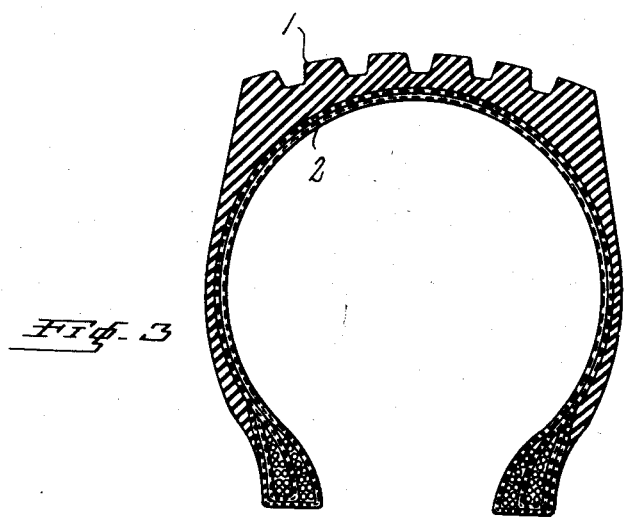
INVENTOR.
HAROLD S. HOWE
BY
James J. Long Patented July 29, 1952

2,605,201

UNITED STATES PATENT OFFICE 2,605,201

WIRE TIRE FABRIC AND CABLE

Harold S. Howe, Detroit, Mich., assignor to United States Rubber Company, New York, N. Y., a corporation of New Jersey Application February 7, 1951, Serial No. 209,787

9 Claims. (Cl. 154—53)

My invention relates to wire tire fabric and more particularly to cables to be used in the manufacture of wire tire fabric. This application is a continuation-in-part of my application Serial No. 777,977, filed October 4, 1947, now abandoned.

It is an object of my invention to provide a new and improved cable for wire tires so constructed as to be extremely resistant to rust or other forms of corrosion when built into a pneumatic tire casing.

Another object of my invention is the provision of an improved wire tire fabric which is so constructed that corrosion is prevented within the cables, which provides an excellent bond between the cables and the rubber compound of the fabric and which may be easily manufactured at low cost.

In the accompanying drawing, Fig. 1 illustrates a cable for wire tires constructed in accordance with my invention; Fig. 2 is a perspective view of wire tire fabric in which the improved cable has been incorporated; and Fig. 3 is a cross sectional view through a pneumatic tire casing utilizing wire tire fabric.

Referring to the drawing Fig. 3 illustrates a pneumatic tire casing 1 which includes ply fabric 2 constructed of wire cables 3, the plies being arranged in the conventional manner with the overlapping plies extending along diagonals at right angles to each other. As best shown by Fig. 2, the ply fabric comprises a plurality of the wire cables 3 arranged side by side in parallel relationship and which are embedded in a thin coating or band of rubber compound 4. After the ply fabric is assembled with bead wires, side walls and tread stock, in a manner well understood in the art, the tire casing is vulcanized in a mold under heat and pressure. During the curing cycle in the mold, the rubber compound in the casing is firmly and securely bonded to the wire cables so that there is good adhesion between the individual cables and the rubber stock.

Wire tires so constructed have performed well under service conditions. They have the advantage that the wire cable plies make the tire substantially puncture proof. Moreover, the number of plies can be considerably reduced in comparison with a tire of the same rating using fabric plies; this reduces the overall weight of the tire particularly when the wire fabric construction is utilized in heavy service casings as for airplanes or trucks.

Although wire tires of the type described perform satisfactorily, under certain conditions there is a tendency for the individual cables of the plies to corrode thereby reducing the strength of the plies and adversely affecting the adherence between the rubber stock and cables. My invention overcomes these deficiencies by providing an improved cable construction which is highly resistant to corrosion and which provides an excellent bond between the individual cable and rubber stock at all times. To this end, I coat one of the strands of the cable with a metal which is sacrificed when corrosion takes place so that the cable is not damaged.

Referring to Fig. 1 of the drawing, the cable 3 has been illustrated by way of example as being constructed of seven strands of steel wire, six of the strands indicated at 5 being cabled around a center strand 6. After twisting the strands together, the cable is plated in a bath to deposit a brass coating around the exterior surface of the cable (i. e., the surface readily accessible from the exterior, or substantially the visible surface), as indicated at 7. The purpose of the brass coating is to improve the adherence between the cable and the rubber stock so that the strength of the bond between the cable and rubber is in excess of the strength of the rubber in shear. Since the rubber stock is not forced into the center of the cable during the curing cycle, it is not necessary to have the interior surfaces of the individual strands brass plated. Moreover, by brass plating the completed cable a considerable saving in cost is effected when compared with a construction in which each individual strand of the cable is plated prior to the cabling operation.

Since the center steel strand and adjacent surfaces of the outer strands are not plated there is danger that corrosion may take place within the interior of the cable particularly if moisture enters the cable either during manufacture or use of the tire. In order to prevent corrosion of the cable, the center strand, only, is coated with zinc 8. Since zinc is electro-positive to iron, any galvanic action induced by moisture between the zinc coated center strand and the iron of the outer steel strands will result in dissipation of the zinc coating in a sacrificial action. In other words, the zinc coating not only acts to protect the center strand, but also protects the adjacent unplated surfaces of the outer steel strands by being consumed in any chemical action between the zinc and iron induced by moisture or other corrosive substances.

There are several advantages in galvanizing only the center strand of the cable. The cost of the cable is reduced since it is necessary to zinc plate or galvanize only one strand in seven. Moreover, the effectiveness of the brass plating in securing good adherence between the rubber and cable is not impaired such as would be the case if the outer strands were galvanized prior to brass plating; it has been found that if the outer strands are first zinc coated to insure against corrosion and then brass plated to provide adhesion to the rubber, that the composition of the brass plate changes in time and adversely affects the bond with the rubber stock. By zinc plating only the interior strand of the cable in accordance with my invention, the bond between the rubber and metal surface of the cable is not impaired. Also, by coating the interior strand of the cable, the zinc is placed at the point where it can function effectively to prevent corrosion, since the interior portions of the cable are most subject to rusting.

I have also found it advantageous in practicing the invention to brass plate the outer strands 5 before they are twisted together with the central strand 6 to form the cable 3. I have found that if the outer strands or outer wires are brass plated by any conventional brass plating operation and then cabled together, there is normally sufficient porosity in the brass coating to permit corrosion of the steel wire. I have found that by inserting a zinc or a zinc coated center strand this porosity of the brass coating permits the desired sacrificial galvanic action to occur between the zinc on the center strand and the steel comprising the interior of the outer strands to prevent corrosion of the steel of the outer strands. In other words, although the brass plating on the outer wires is superficially continuous and appears to cover the entire surface of the wires, there are nevertheless actually local discontinuities in the brass plating which permit galvanic action between the zinc and the steel. The advantage of this is that even though the outer strands are entirely brass plated, corrosion is prevented. This is in contrast to a conventional brass plated steel wire cable, wherein the brass plating ordinarily actually increases the tendency of the cable to corrode because there is an unfavorable galvanic action set up between the brass and the steel in the presence of moisture. By providing the zinc coated strand in combination with the brass plated strand, I have reversed the effect of the corrosive action, and obtain instead sacrifice of the zinc to the benefit of the steel.

My invention may also be used in a wire tire fabric employing other bonding agents between the cables and rubber stock. For example, it has been found that the center zinc coated conductor functions to prevent corrosion in those instances in which the rubber is bonded to the wire cable by means of a rubber hydrochloride adhesive such as described in Patent 2,147,620, issued February 14, 1939. Since only the central conductor is zinc plated there is no danger of the zinc coating deteriorating the adhesive bond between the cable and rubber stock.

In the form of the invention illustrated by Fig. 1, a seven strand cable has been utilized in employing my invention. However, it should be manifest that the number of cable strands may be increased or decreased at will and that any interior strand or strands of the cable may be zinc plated in accordance with my invention.

If desired, the center strand may be composed entirely of zinc, instead of being merely zinc plated. The essential feature is that one of the strands be composed of zinc at least on its surface.

Having thus described my invention, what I claim and desire to protect by Letters Patent is:

1. In a wire tire fabric, a corrosion resistant cable suitable for bonding to rubber stock of the fabric comprising a plurality of steel strands cabled together, one of the interior strands of the cable being zinc coated and the visible exterior surfaces only of the outer strands being brass plated for bonding to the rubber stock.

2. A cable for bonding to rubber stock comprising a plurality of steel strands cabled together and being brass plated on the exterior surfaces thereof, at least part of the interior steel surfaces being unplated, and the center strand of the cable being zinc plated.

3. A cable for wire fabric tires comprising a plurality of fine steel strands cabled together and being brass plated on the exterior surfaces thereof for adhesion to rubber stock, part of the interior steel surfaces being unplated, and one of the interior strands of the cable being zinc plated.

4. In a wire tire fabric, a cable comprising a plurality of steel strands cabled together, the assembly being brass plated on the exterior surface thereof for bonding to the rubber stock of the fabric, part of the interior steel surface being unplated, one of the interior strands being coated with a corrosion preventing metal electropositive to iron for protecting the strand and the adjacent unplated surfaces of the steel strands.

5. A wire tire fabric comprising a plurality of cables, each cable comprising a plurality of steel strands cabled together and being brass coated on the exterior surfaces thereof for adhesion to rubber stock, part of the interior steel surfaces being uncoated, one of the interior strands of the cable being zinc coated to prevent corrosion of the one strand and the adjacent uncoated surfaces of the remaining strands, and a layer of rubber stock bonded to and enclosing the cables.

6. A cable for bonding to rubber stock comprising a plurality of steel strands cabled together, some of the strands being brass plated and other strands being zinc plated.

7. A cable for bonding to rubber stock comprising a plurality of brass plated steel strands cabled together with an interior strand being composed of zinc at least on its surface.

8. In a wire tire fabric, a cable comprising a plurality of steel strands cabled together, the outer strands of the assembly being brass plated for bonding to the rubber stock of the fabric, and one of the interior strands being coated with a corrosion preventing metal electropositive to iron for protecting the strand and the underlying steel surfaces of the brass plated strands.

9. In a wire tire fabric, a cable comprising a plurality of steel strands cabled together, the outer strands of the assembly being brass plated for bonding to the rubber stock of the fabric, and one of the interior strands being composed at least on its surface of a corrosion preventing metal electropositive to iron for protecting the underlying steel surfaces of the brass plated strands.

HAROLD S. HOWE.

REFERENCES CITED

The following references are of record in the file of this patent:

UNITED STATES PATENTS

| Number | Name | Date |
| --- | --- | --- |
| 1,453,217 | Weigel | Apr. 24, 1923 |
| 1,602,870 | Villiers | Oct. 12, 1926 |
| 2,038,549 | Domm | Apr. 28, 1936 |
| 2,143,694 | Hauvette | Jan. 10, 1939 |

FOREIGN PATENTS

| Number | Country | Date |
| --- | --- | --- |
| 437,310 | Great Britain | Oct. 28, 1935 |